United States Patent [19]
Nishimura et al.

[11] Patent Number: 5,502,791
[45] Date of Patent: Mar. 26, 1996

[54] SPEECH RECOGNITION BY CONCATENATING FENONIC ALLOPHONE HIDDEN MARKOV MODELS IN PARALLEL AMONG SUBWORDS

[75] Inventors: Masafumi Nishimura; Masaaki Okochi, both of Yokohama, Japan

[73] Assignee: International Business Machines Corporation, Armonk, N.Y.

[21] Appl. No.: 114,709

[22] Filed: Sep. 1, 1993

[30] Foreign Application Priority Data

Sep. 29, 1992 [JP] Japan .................................. 4-259301

[51] Int. Cl.$^6$ ........................................ G10L 9/00
[52] U.S. Cl. .................................................. 395/2.65
[58] Field of Search ............................ 395/2, 2.64–2.66, 395/2.6–2.63; 381/41, 42, 43, 45

[56] References Cited

U.S. PATENT DOCUMENTS

| | | | |
|---|---|---|---|
| 4,817,156 | 3/1989 | Bahl et al. | 395/2.65 |
| 5,031,217 | 7/1991 | Nishimura | 395/2.65 |
| 5,129,001 | 7/1992 | Bahl et al. | 381/43 |
| 5,199,077 | 3/1993 | Wilcox et al. | 395/2.65 |
| 5,278,942 | 1/1994 | Bahl et al. | 395/2 |
| 5,317,673 | 5/1994 | Cohen et al. | 395/2.41 |

FOREIGN PATENT DOCUMENTS

| | | | |
|---|---|---|---|
| 362785A2 | 4/1990 | European Pat. Off. | G10L 5/06 |
| 504927A2 | 9/1992 | European Pat. Off. | G10L 5/06 |
| 2240203 | 7/1991 | United Kingdom | G10L 5/06 |

OTHER PUBLICATIONS

L. R. Bahl et al., "Acoustic Markov Models Used in the Tangora Speech Recognition System," ICASSP '88, Apr. 11–14, 1988, pp. 497–500.

Bahl, L. R., et al. "Acoustic Markov Models Used In The Tangora Speech Recognition System." *Proceedings of the 1988 IEEE International Conference on Acoustics, Speech, and Signal Processing*, S11–13, pp. 497–500, Apr. 1988.

Bahl, L. R., et al. "A Maximum Likelihood Approach to Continuous Speech Recognition." *IEEE Transactions on Pattern Analysis and Machine Intelligence*, vol. PAMI-5, No. 2, pp. 179–190, Mar. 1983.

Schwartz, R., et al. "Context–Dependent Modeling For Acoustic–Phonetic Recognition Of Continuous Speech." *Proceedings of the 1985 IEEE International Conference on Acoustics, Speech, and Signal Processing*, Tampa, Florida, pp. 1205–1208, Mar. 1985.

*Primary Examiner*—Allen R. MacDonald
*Assistant Examiner*—Michael A. Sartori
*Attorney, Agent, or Firm*—Marc D. Schechter; Robert P. Tassinari, Jr.

[57] ABSTRACT

Analysis of a word input from a speech input device 1 for its features is made by a feature extractor 4 to obtain a feature vector sequence corresponding to said word, or to obtain a label sequence by applying a further transformation in a labeler 8. Fenonic hidden Markov models for speech transformation candidates are combined with N-gram probabilities (where N is all integer greater than or equal to 2) to produce models of words. The recognizer determines the probability that the speech model composed for each candidate word would output the label sequence or feature vector sequence input as speech, and outputs the candidate word corresponding to the speech model having the highest probability to a display 19.

6 Claims, 7 Drawing Sheets

| MODEL NUMBER | TRANSITION NUMBER | | |
|---|---|---|---|
| | 1 | 2 | 3 |
| 1 | 0.1 | 0.8 | 0.1 |
| 2 | 0.2 | 0.6 | 0.2 |
| ⋮ | ⋮ | ⋮ | ⋮ |
| 128 | 0.2 | 0.7 | 0.1 |

FIG. 4B

| MODEL NUMBER | LABEL NUMBER | | | | |
|---|---|---|---|---|---|
| | 1 | 2 | 3 | ------ | 128 |
| 1 | 0.7 | 0.01 | 0.01 | ------ | 0.04 |
| 2 | 0.01 | 0.8 | 0.01 | ------ | 0.01 |
| 3 | 0.01 | 0.02 | 0.6 | ------ | 0.01 |
| ⋮ | ⋮ | ⋮ | ⋮ | ⋮ | ⋮ |
| 128 | 0.01 | 0.01 | 0.02 | ------ | 0.75 |

FIG. 4C

| PRECEDING PHONEME | ALLOPHONE NUMBER | SUBSEQUENT PHONEME | ALLOPHONE NUMBER | OCCURENCE PROBABILITY |
|---|---|---|---|---|
| /K/ | 1 | /A/ | 1 | 0.2 |
| /K/ | 1 | /A/ | 2 | 0.8 |
| /K/ | 2 | /A/ | 1 | 0.6 |
| /K/ | 2 | /A/ | 2 | 0.4 |
| /K/ | 1 | /I/ | 1 | 0.1 |
| /K/ | 1 | /I/ | 2 | 0.5 |
| /K/ | 1 | /I/ | 3 | 0.4 |
| ⋮ | ⋮ | ⋮ | ⋮ | ⋮ |
| /W/ | 4 | /O/ | 3 | 0.2 |

SPEECH RECOGNITION BY CONCATENATING FENONIC ALLOPHONE HIDDEN MARKOV MODELS IN PARALLEL AMONG SUBWORDS

BACKGROUND OF THE INVENTION

This invention relates to speech models using hidden Markov models in subword units, such as phones (or phonemes), and speech recognition using such speech models, and more particularly to enabling efficient speech recognition in response to pronunciation transformations (fluctuations).

Speech recognition utilizing Markov models is intended to perform speech recognition from the viewpoint of probability. In recent years, there have been systems proposed for large vocabulary speech recognition and continuous speech recognition based on hidden Markov models in subword units, such as phones (or phonemes) and syllables.

As a representative conventional method, there is a method of speech recognition such that phonetic hidden Markov models are combined in series to represent a word to be recognized. In this method, the choice of such phonetic hidden Markov models to be concatenated is made on the basis of a description (baseform) in a pronunciation dictionary of words to be recognized. However, since actual speech undergoes transformation depending on the types of preceding and subsequent phonemes, pronunciation speed, and accentuation, it is difficult to obtain a high recognition rate if phonetic hidden Markov models are concatenated without regard to such transformations.

Then, there is another method such that phonetic hidden Markov models are prepared for each phonetic environment (context) in consideration of only preceding and subsequent phonetic environments. Phonetic hidden Markov models are selected according to the phonetic environment described in a pronunciation dictionary of words to be recognized, and are then combined in series. This method is dealt with in detail in "Context-Dependent Modeling for Acoustic-Phonetic Recognition of Continuous Speech" (*Proceedings of ICASSP '85*, April 1985 R. Schwartz, Y. Chow, O. Kimball, S. Roucos, M. Krasner, J. Makhoul). Although this method can easily reflect a speech transformation for each phonetic environment, it should prepare a large number of phonetic hidden Markov models to handle various speech transformations because combinations of phonetic environments are extremely many, and it requires a large amount of training speech data.

Moreover, for speaker-independent speech recognition, where pronunciation fluctuations are markedly different from one speaker to another, this method would result in loose models because each single phonetic hidden Markov model is required to include all pronunciation fluctuations attributable to each speaker, resulting in a lowered ability to distinguish phonemes.

On the other hand, there is another method such that knowledge about transformations and fluctuations in speech for each word is represented by a combination of subword hidden Markov model networks. This method is dealt with in detail in "A Maximum Likelihood Approach to Continuous Speech Recognition" (*IEEE Transactions on Pattern Analysis and Machine Intelligence,* Volume PAMI-5, No. 2, pp. 179–190, March 1983, L. R. Bahl, F. Jelinek, R. L. Mercer).

However, it is not easy to manually prepare such a network representation for each word, and it is also not necessarily possible to precisely associate knowledge from human senses with individual physical phenomena.

Furthermore, there is another method such that parameters (transition probabilities) on a network are trained and determined for each word. Yet, this method requires a large amount of training speech data to obtain a network representation of each word, so it was not easy to modify words to be recognized in spite of subwords being adopted as units.

SUMMARY OF THE INVENTION

It is an object of the invention to provide a speech recognizer efficiently representing various pronunciation transformations by a statistical combination (N-gram) of a few kinds of hidden Markov models.

In order to achieve the above-stated object, this invention provides for each phoneme some representative models as allophone hidden Markov models representing transformations (allophones) of each phoneme as a subword. This is automatically effected on the basis of clustering techniques. Also, speech phenomena such as word pronunciation are represented by speech models where the combination of such allophone hidden Markov models is weighted by an N-gram probability (the occurrence probability of N sets of allophone hidden Markov models), and these speech models are used for speech recognition.

In training a model, a training speech model is composed by connecting a plurality of allophone hidden Markov models with each phoneme under the restriction of an N-gram probability, by reference to the baseform of the training speech, and parameters for an N-gram model among allophone hidden Markov models, as well as parameters for each allophone hidden Markov model, are automatically estimated by applying such techniques as maximum likelihood estimation to improve the speech recognition performance of hidden Markov models.

As an example, think of a word speech model composed under the restriction of a bigram probability (the occurrence probability of a pair of allophone hidden Markov models). If a pronunciation dictionary (phonemic transcription) is provided for a particular word, a word speech model is composed by joining hidden Markov models in phonemic units according to the pronunciation dictionary. On this occasion, each phoneme is assigned a plurality of allophone hidden Markov models, namely, $A(p,i)$, where p denotes a phoneme and i the type of allophone of phoneme p. These allophone hidden Markov models for each phoneme are all processed in parallel, though the combinations of statistically unnecessary bigrams of allophone hidden Markov models are not considered. That is, if the phonemic series of a word speech model is given as $P=p(1)p(2) \ldots p(w)$, the occurrence probability of a pair of allophones (i.e., $Pr[A(p(j),m)|A(p(j-1),n)]$) is evaluated in the form of a product with the likelihood of ordinary hidden Markov models in a transition from an allophone hidden Markov model, $A(p(j-1),n)$, for the $(j-1)$-th phoneme to another allophone hidden Markov model model, $A(p(j),m)$, for the j-th phoneme.

The term "subword" as referred to in this specification denotes such constituents of speech as a phoneme, syllable, CVC, and VCV (C: consonant; V: vowel), which are not directly associated with pronunciation but refer to phonetic units serving to express different meanings. It may be set at will where to delimit speech to define a subword.

The term "word" as referred to in this specification denotes one unit of an object to be recognized, such as a word, phrase, or sentence, which may be chosen at will.

The term "speech transformation candidate" as referred to in this specification denotes an allophone if the phoneme is defined as a subword, in which case the speech transformation candidate is each subword transformed when the phoneme is pronounced as speech.

There are two types of hidden Markov model, i.e., discrete hidden Markov models outputting labels and continuous hidden Markov models outputting feature vectors. This invention allows use of either type of hidden Markov model. For continuous hidden Markov models, speech recognition is effected according to a feature vector sequence obtained as a result of an analysis of input speech for its features, whereas for discrete hidden Markov models, speech recognition is effected according to a label sequence obtained as a result of a further conversion of the feature vector sequence.

DESCRIPTION OF THE PREFERRED EMBODIMENTS

In this embodiment, this invention is applied to the speech recognition of words where fenonic Markov models are employed as hidden Markov models for label units and a bigram (N=2) is used as N-gram.

In fenonic Markov models, because models bearing the same label name are treated as a common model when such models are trained and recognized, it is possible to save storage space and to obtain higher training efficiency. Also, fenonic Markov models enable label sequences obtained from pronunciation to correspond directly to model sequences and thus facilitate creation of initial models for allophone hidden Markov models. Such label sequences representing model sequences are called fenonic baseforms in correspondence to the baseforms of phonemic models.

Fenonic Markov models are dealt with in detail in the article "Acoustic Markov Models Used ill The Tangora Speech Recognition System" (*Proceedings of ICASSP '88*, April 1988, S11-3, pages 497–500, L. R. Bahl, P. F. Brown, P. V. de Souza, R. L. Mercer and M. A. Picheny).

Figure 1:
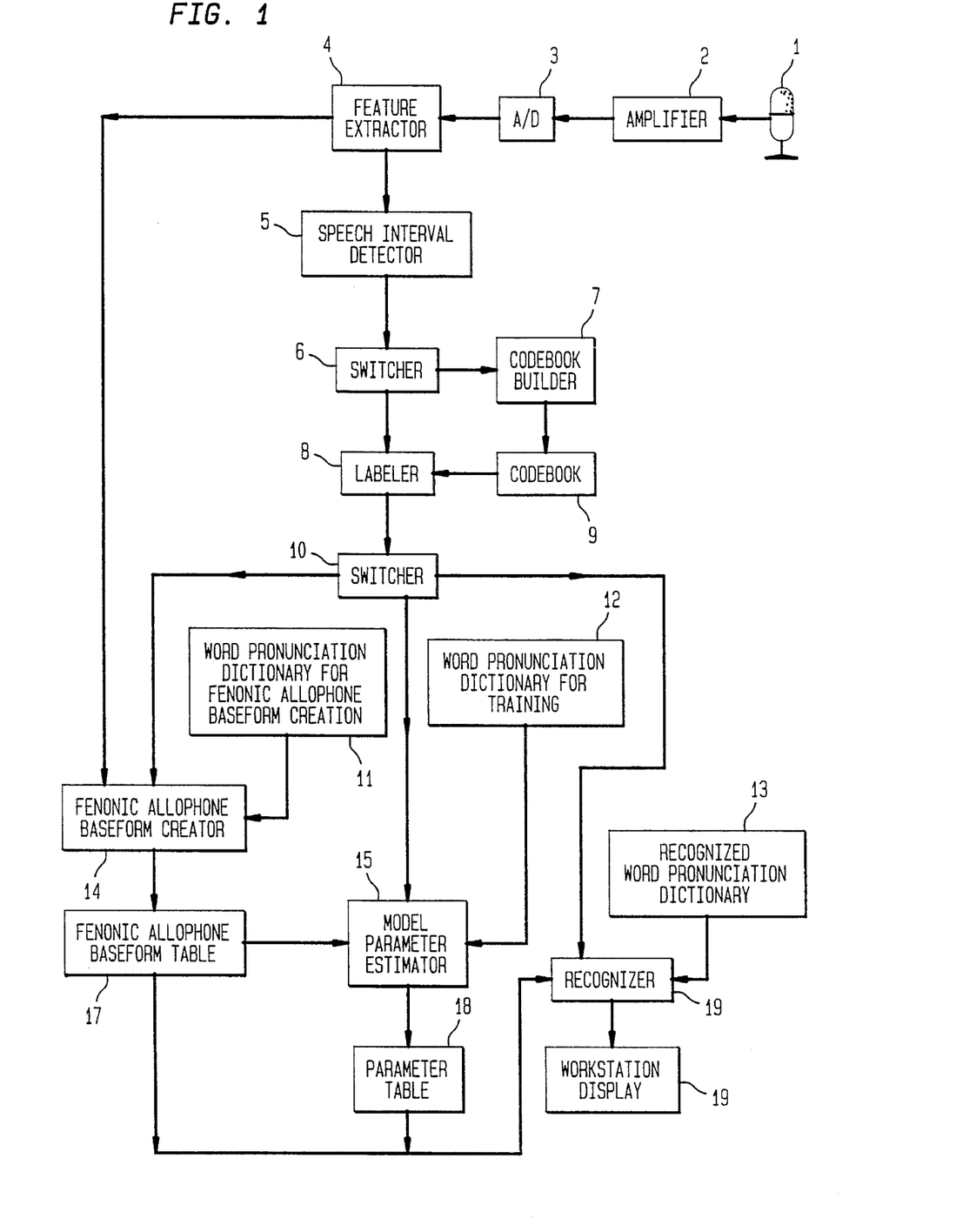
FIG. 1 is a block diagram of the speech recognizer related to an embodiment of this invention.

FIG. 1 is a complete block diagram of the speech recognizer related to this embodiment. Input speech (words) is fed through a microphone 1 and an amplifier 2 to an analog-to-digital (A/D) convertor 3, whereby the input speech is converted into digital data. The speech data thus digitized is then fed to a feature extractor 4.

In the feature extractor 4, the speech data first undergoes a discrete Fourier transform and is then output from a nineteen-channel critical band-pass filter reflecting acoustic characteristics together with a logarithmic power value. This output is sent to an end point detector 5 at intervals of about 10 milliseconds (this unit interval is called a frame), for instance. Then only the feature values of frames judged as falling within a word speech interval are sent to a switcher 6 and then to either a codebook builder 7 or a labeler 8.

During codebook estimation, the switcher 6 is switched to the codebook builder 7, so that the feature values are fed from the feature extractor 4 to the codebook builder 7. The codebook builder 7 then compiles a codebook 9 from the feature values which are clustered with 128 types of labels.

On the other hand, when speech data is recognized, a fenonic allophone baseform is registered, or model parameters are estimated, the switcher 6 is switched to the labeler 8. The labeler 8 assigns a label to each frame from the codebook 9.

Figure 2:
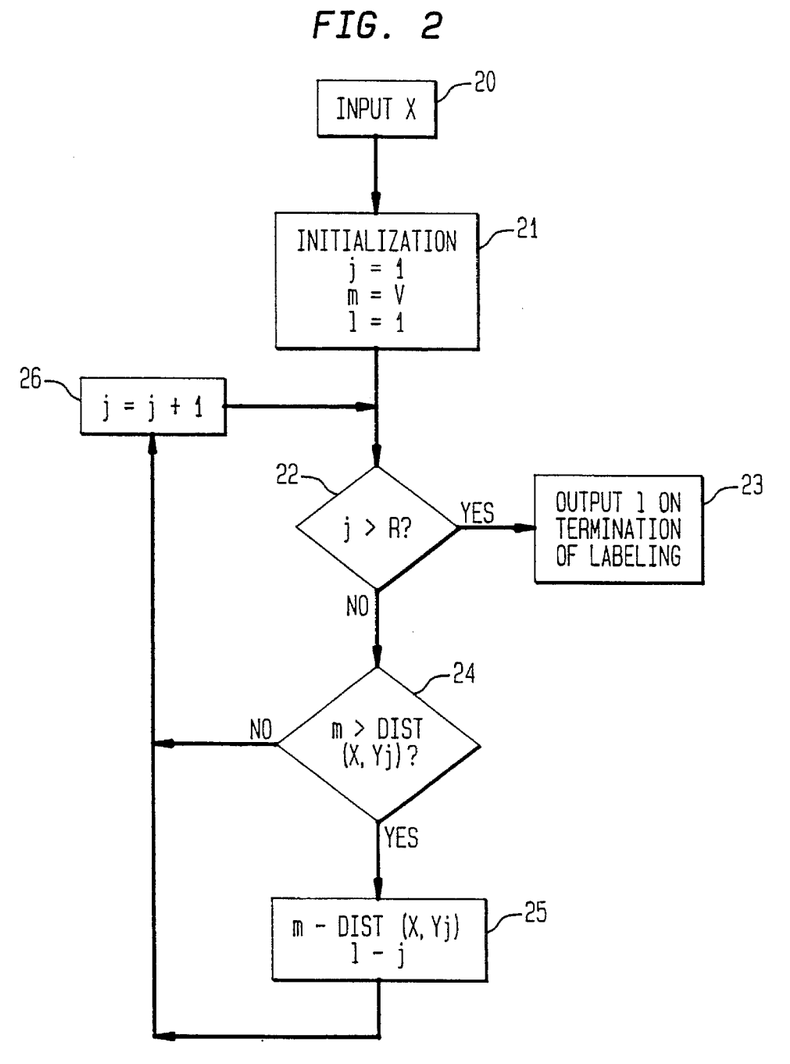
FIG. 2 is a flowchart of labeling speech.

The labeling is effected as shown in FIG. 2, where X denotes the feature values of a frame of input speech (words), Yj denotes the feature values of the j-th label in the codebook, R denotes the size (=128) of the codebook, dist (X, Yj) denotes the Euclidean distance between X and Yj, and m denotes the minimum value of dist (X, Yj) at each iteration.

First, if a feature value X is inputted (step 20), then j, m, and l (a label number finally assigned to the feature value X inputted) are initialized to 1, a very large value V, and 1, respectively (step 21).

Second, a judgment is made as to whether all the feature values in the codebook have been checked under the condition "j>R" (step 22), and another judgment is made as to whether a label bearing a distance shorter than the distance obtained so far under the condition "m>dist (X, Yj) has been found (step 24).

Third, when a label bearing a shorter distance is found, its label number, j, is stored in l for the time being (step 25). When no such label is found, the label number, l, remains as it is, and checks are run sequentially through the codebook up to the last label number, R, (step 22) by incrementing j by one to see if there is a label bearing a still shorter distance (step 26). Finally, the label number of the label bearing the shortest distance, that is, the label number of the label most like the input feature value, X, is output as an observed label (label number) l (step 23).

Referring again to FIG. 1, a label sequence of a plurality of labels, output for each frame from the labeler 8 corresponds to a phoneme, and an aggregate label sequence of some label sequences corresponding to such phonemes corresponds to an input speech word. This label sequence corresponding to a word is fed through a switcher 10 to either the fenonic allophone baseform creator 14, model parameter estimator 15, or recognizer 16.

Again, in this embodiment, speech models are presupposed to output label sequences and therefore input speech is transformed into a label sequence. However, speech models may be presupposed to output feature vector sequences, in which case the feature values obtained by a feature analysis of speech as an object of recognition are fed to the recognizer 16 without undergoing label transformation.

When a fenonic allophone baseform is created, the switcher 10 is switched to the fenonic allophone baseform creator 14. A label sequence is fed to the fenonic allophone baseform creator 14, and a fenonic allophone baseform table 17 is created by reference to the word pronunciation dictionary 11 for allophone baseform creation and the output of the feature extractor 4. The operation of the fenonic allophone baseform creator 14 will be described below with reference to FIG. 5.

When the parameters of a Markov model are estimated, the switcher 10 is switched to the model parameter estimator 15. The model parameter estimator 15 trains the model by reference to the label sequence, the fenonic allophone baseform table 17, and the training word pronunciation dictionary 12. Model parameter estimator 15 determines the parameter values (the parameters of fenonic Markov models and of bigrams) in the parameter table 18. The operation of the model parameter estimator will be described below with reference to FIGS. 6 and 8.

When speech is recognized, the switcher 10 switches to the recognizer 16 which recognizes input speech according to an input label sequence, the fenonic allophone baseform table 17, the parameter table 18, and the pronunciation dictionary 13 of words to be recognized. The operation of the recognizer 16 will be described below with reference to FIGS. 7 and 8. The output of the recognizer 16 is fed to a workstation 19, where the words thus recognized are displayed on its display for example.

All devices other than the microphone 1, amplifier 2, A/D converter 3, and display 16 shown in FIG. 1 are implemented as software on the workstation.

Figure 3:
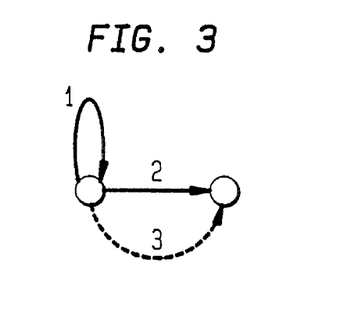
FIG. 3 is a conceptual drawing of a fenonic Markov model.

FIG. 3 shows the structure of a fenonic hidden Markov model used in this embodiment. The nodes drawn as circles in this drawing represent states. The state transition 3 drawn as a dashed line is a null transition causing no label output.

Figure 4A:
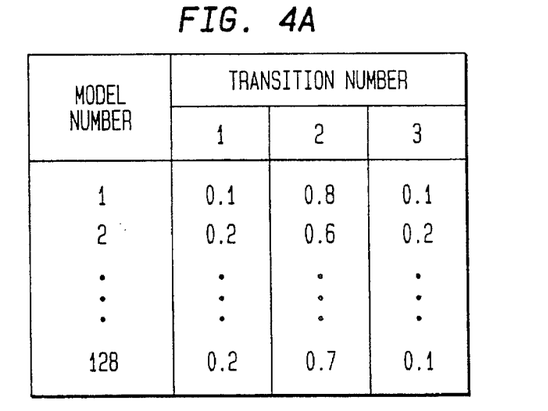
FIG. 4(a) is a table of transition probabilities for fenonic Markov models.
Figure 4B:
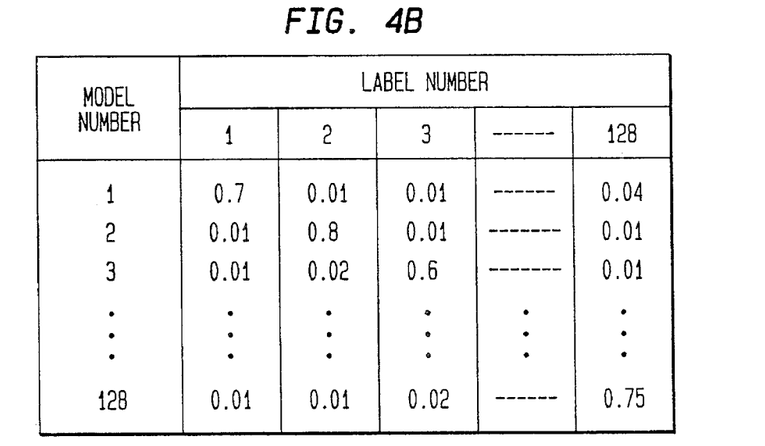
FIG. 4(b) is a table of label output probabilities for fenonic Markov models.

In this embodiment, 128 such fenonic hidden Markov models with corresponding label numbers are provided. The respective fenonic hidden Markov models are assigned such occurrence probabilities as shown in FIG. 4(a) corresponding to the respective state transitions 1, 2 and 3 shown in FIG. 3. Moreover, 128 types of fenonic hidden Markov models are respectively assigned such probabilities of outputting 128 types of labels (at transitions 1 and 2) as shown in FIG. 4(b). The parameters of these fenonic hidden Markov models are retained in the parameter table 18.

In this embodiment, fenonic hidden Markov models corresponding to allophones of each phoneme are introduced into the composition of speech models in word units and such fenonic hidden Markov models of phonemes inclusive of allophones are concatenated in parallel in correspondence to list of phonemes along words so as to cope with fluctuations due to phonemic transformations in word pronunciation. Bigrams of fenonic hidden Markov models restricting the concatenation of fenonic hidden Markov models of phonemes inclusive of such allophones is also retained to represent the occurrence probabilities of allophones of subsequent phonemes under the conditions of the allophones of preceding phonemes in a word in the parameter table 18.

In this embodiment, only the concatenation of allophones is restricted, and the probabilities of phonemic combinations are presupposed to be the same among all phonemes. For instance, in the occurrence probability of the pair, $$Pr[A(p(j),m)|A(p(j-1),n)] = Pr[m|p(j),A(p(j-1),n)] \, Pr[p(j)|A(p(j-1),n)]$$
$$= Pr[m|p(j),A(p(j-1),n)] \, Pr[p(j)|p(j-1)],$$

the inter-phonemic bigram $Pr[p(j)|p(j-1)]$ is assumed to be always constant with respect to all phonemes. This invention allows inclusion of such an inter-phonemic bigram, in which case it is necessary to prepare a considerably large amount of learning data for the compilation of each dictionary.

Figure 4C:
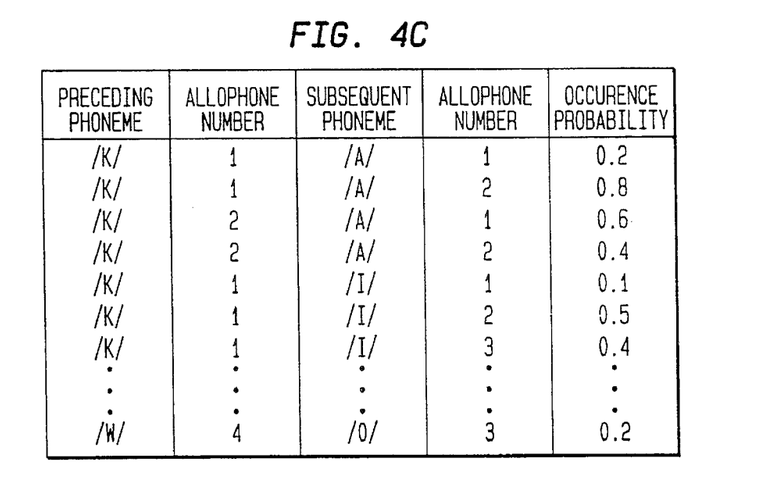
FIG. 4(c) is a table of occurrence probabilities of bigrams of allophones of fenonic Markov models.

Also, this invention allows composition of a speech model without imposing an N-gram restriction, or by omitting such parameters as shown in FIG. 4(c) (parameter table) on the assumption N=1. In this case as well, it is possible to achieve the intended object of this invention, that is, the materialization of a speech recognizer expressing phonetic transformations and a reduction in storage capacity for models.

With regard to the word "KASA", for instance, there are some speech transformation candidates forming allophones of each other. For example, K1 and K2 are allophones of the phoneme K, A1 and A2 are allophones of the phoneme A, and S1, S2, and S3 are allophones of the phoneme S. A speech model for the word "KASA" is composed by concatenating in parallel fenonic hidden Markov models corresponding to these speech transformation candidates according to the bigram occurrence probabilities. The parameter table 18 retains the probability of an allophone occurring after the immediately preceding phoneme (speech transformation candidate) for each phoneme (speech transformation candidate) in the word.

Again, in this embodiment, because the inter-phonemic bigram is assumed to be constant with respect to all phonemes, the probability of /A/ following /K/ as well is presupposed to be the same as that of /I/ following /K/.

The speech recognizer in this arrangement performs three major operations: (1) creation of fenonic allophone baseforms, (2) estimation of model parameters, and (3) speech recognition. The first two operations are preparatory ones for speech recognition. These operations are input as described in the word pronunciation dictionary 13.

Figure 5:
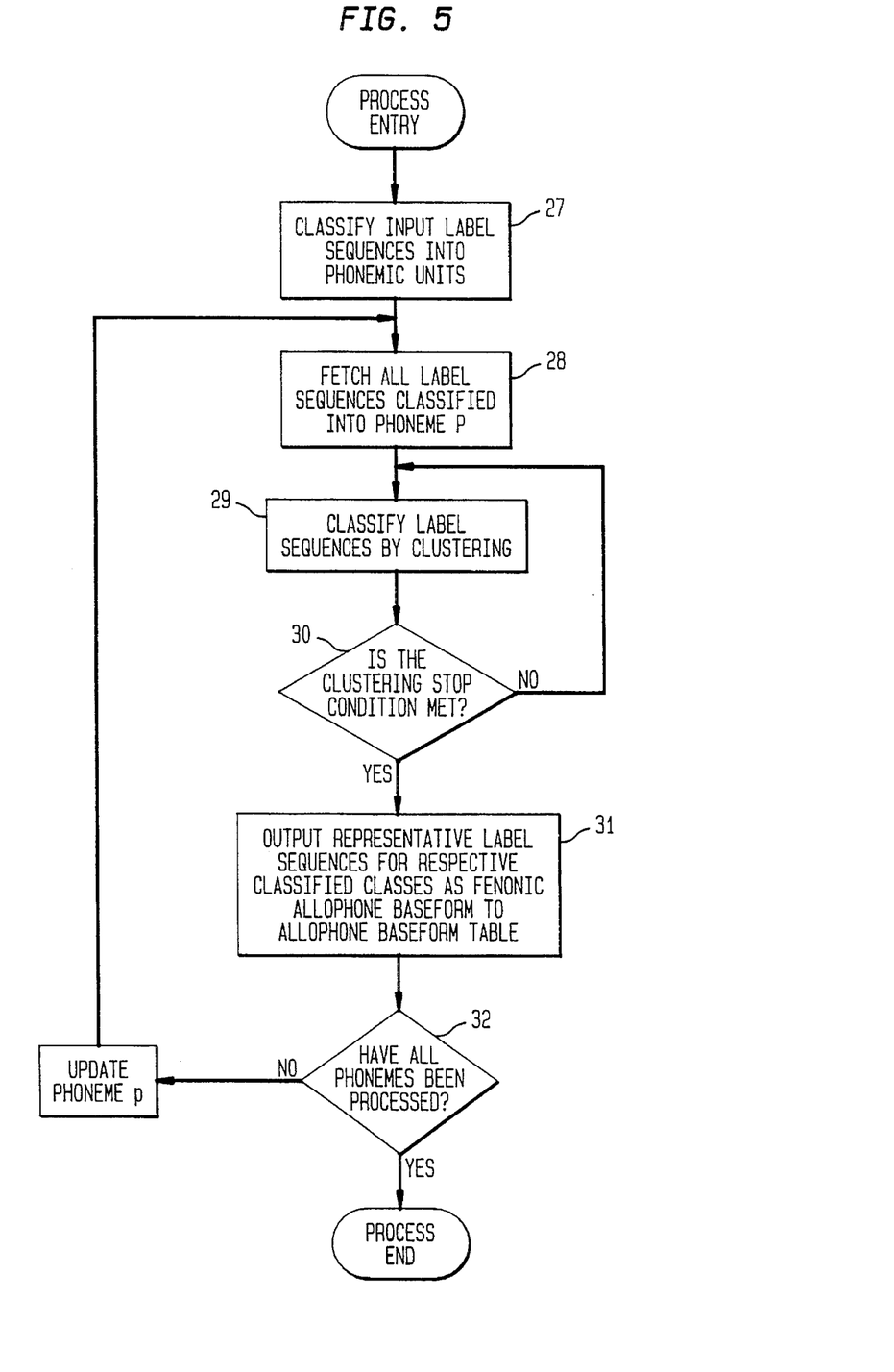
FIG. 5 is a flowchart of fenonic allophone baseform creation.

Fenonic allophone baseforms are created by the above-mentioned fenonic allophone baseform creator 14 in the procedure shown in FIG. 5.

First, word speech inputted through the microphone 1 is transformed into an input label sequence by the labeler 8 for fenonic allophone baseform creation. This input label sequence is then fed from the switcher 10 to the fenonic allophone baseform creator 14. This input label sequence is partitioned into phonemic units by reference to the word pronunciation dictionary 11 for fenonic allophone baseform creation in which the phonemic sequence of the input word pronunciation is transcribed (step 27). On this occasion, the variation of the feature values output from the feature extractor 4 are used for the determination of phonemic boundaries. This operation is performed on all word speech for fenonic allophone baseform creation. All input label sequences are thus partitioned and classified according to phonemes.

The label sequences for all segments classified as a given phoneme p are retrieved (step 28). Clustering is carried out for each phoneme by use of this data, and labels representative of the respective classes are selected (step 29 and step 30). As a result, the label sequences of all allophone candidates (speech transformation candidates) are obtained.

The distance between labels for use during clustering is defined by use of the likelihood of a model, considering one as a fenonic Markov phoneme baseform and the other as all input label sequence. On this occasion, the parameters of the fenonic Markov models which are used are initial parameter values previously trained in word pronunciation.

The representative label sequences of speech transformation candidates obtained for each phoneme are recorded as fenonic allophone baseforms in the fenonic allophone baseform table 17 (step 31). The above-described series of processing is performed on all phonemes included ill the input word speech (step 32) and then the creation of the fenonic allophone baseform table 17 is terminated.

Thus, the label sequences of the speech transformation candidates (allophones) for each phoneme are stored in the fenonic allophone baseform table 17 created above.

The recognition process may be based on either the label sequence or the feature vector sequence. However, when speech recognition is carried out using fenonic hidden Markov models as in this embodiment, the fenonic allophone baseform should be defined as the label sequence because fenonic hidden Markov models are label-unit-based. On the other hand, other types of hidden Markov models, unlike fenonic hidden Markov models, do not compose model sequences on the basis of label sequences. In such a case, the allophone baseform table 17 contains hidden Markov models for each speech transformation candidate (allophone).

Figure 6:
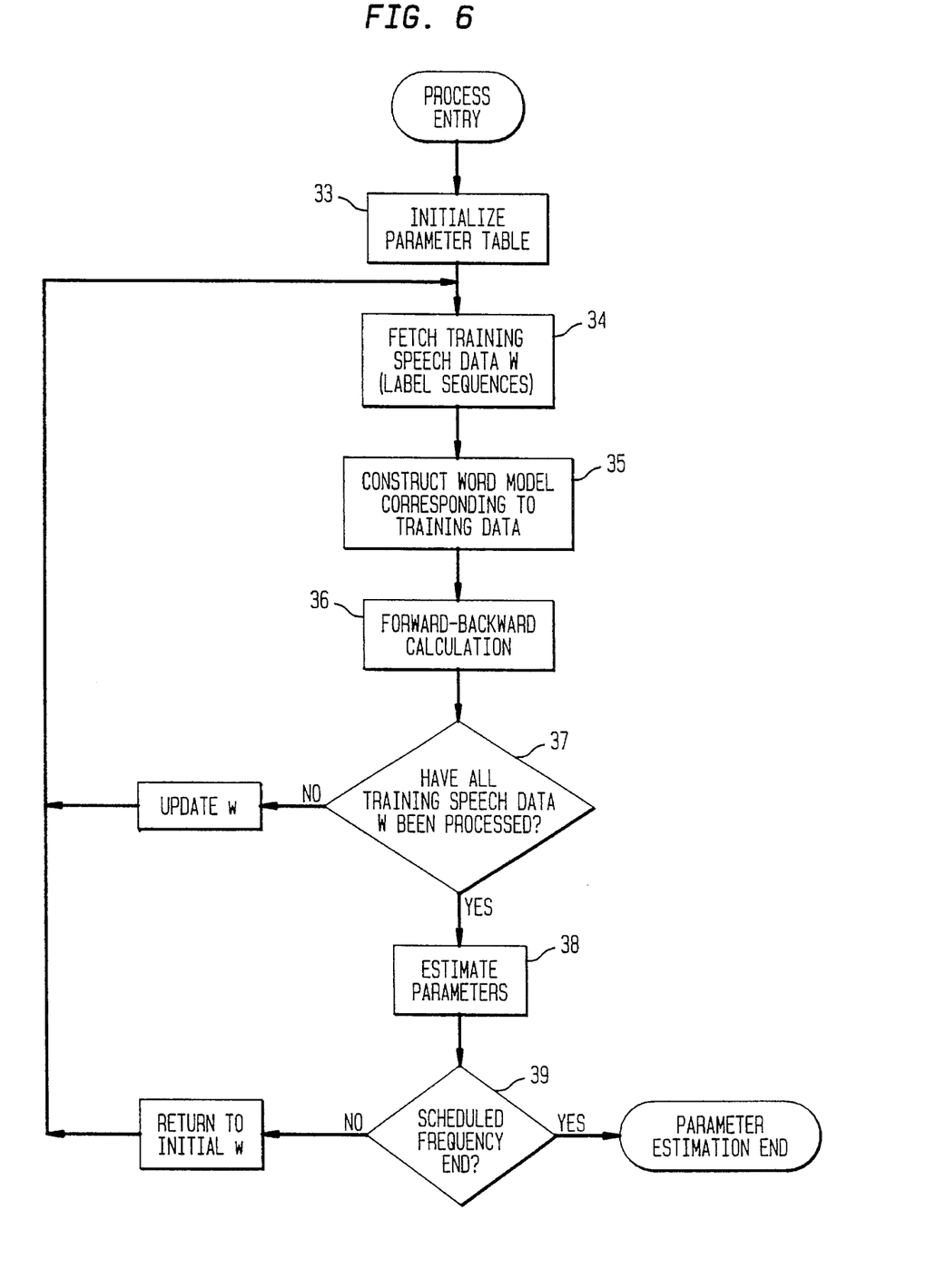
FIG. 6 is a flowchart of model parameter estimation.

Model parameter estimation is carried out to modify (train) the parameters of fenonic hidden Markov models themselves as shown in FIG. 4(*a*) and 4(*b*) and the parameters of all inter-phonemic bigram as shown in FIG. 4(*c*) so as to facilitate output of words to be recognized, and is carried out by the above-mentioned model parameter estimator 15 in the procedure shown in FIG. 6.

First, the parameter table 18 is initialized (step 33). On this occasion, previously trained parameters may be used as initial values.

Figure 8:
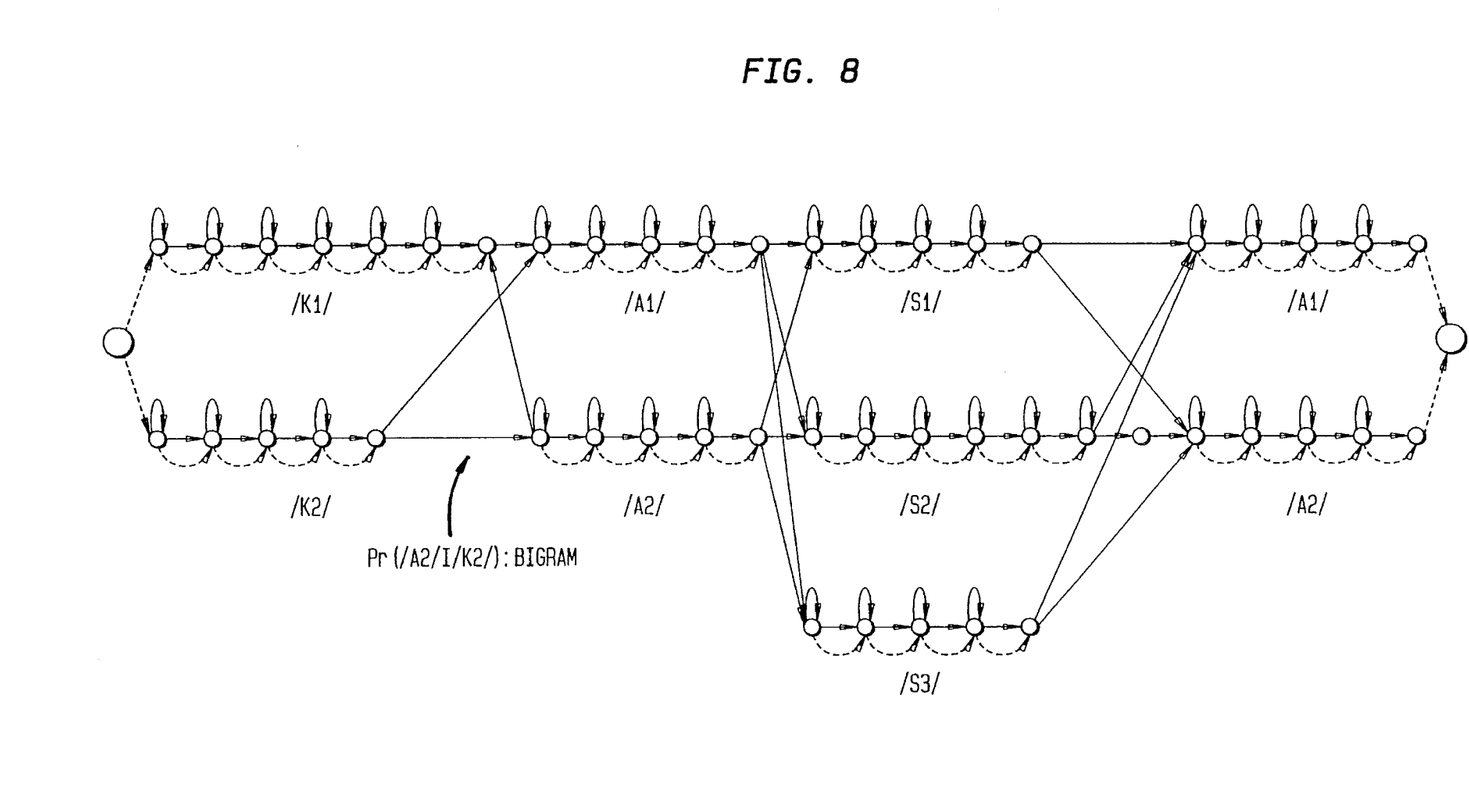
FIG. 8 is a conceptual drawing of a speech model representing words.

Next, the label sequence of training word speech ("KASA" for example) is fetched through the switcher 10 (step 34). A word speech model, as shown in FIG. 8, corresponding to this training word speech is composed by reference to the training word pronunciation dictionary 12, fenonic allophone baseform table 17, and parameter table 18 (step 35), and then the parameters of each fenonic hidden Markov model and each inter-phonemic bigram are determined by performing forward-backward calculations (step 36).

After these calculations are performed on all training word speech data (step 37), the parameters of all fenonic hidden Markov models and the bigrams are estimated by maximum likelihood estimation by use of the results of these calculations (step 38), and the parameter table 18 is updated with the resulting parameters.

Then the above-described series of processes (steps 34 to 38) is repeated as many times as prescribed (e.g., five times) by reference to the newly estimated parameter table 18, and then model parameter estimation is terminated (step 39).

Figure 7:
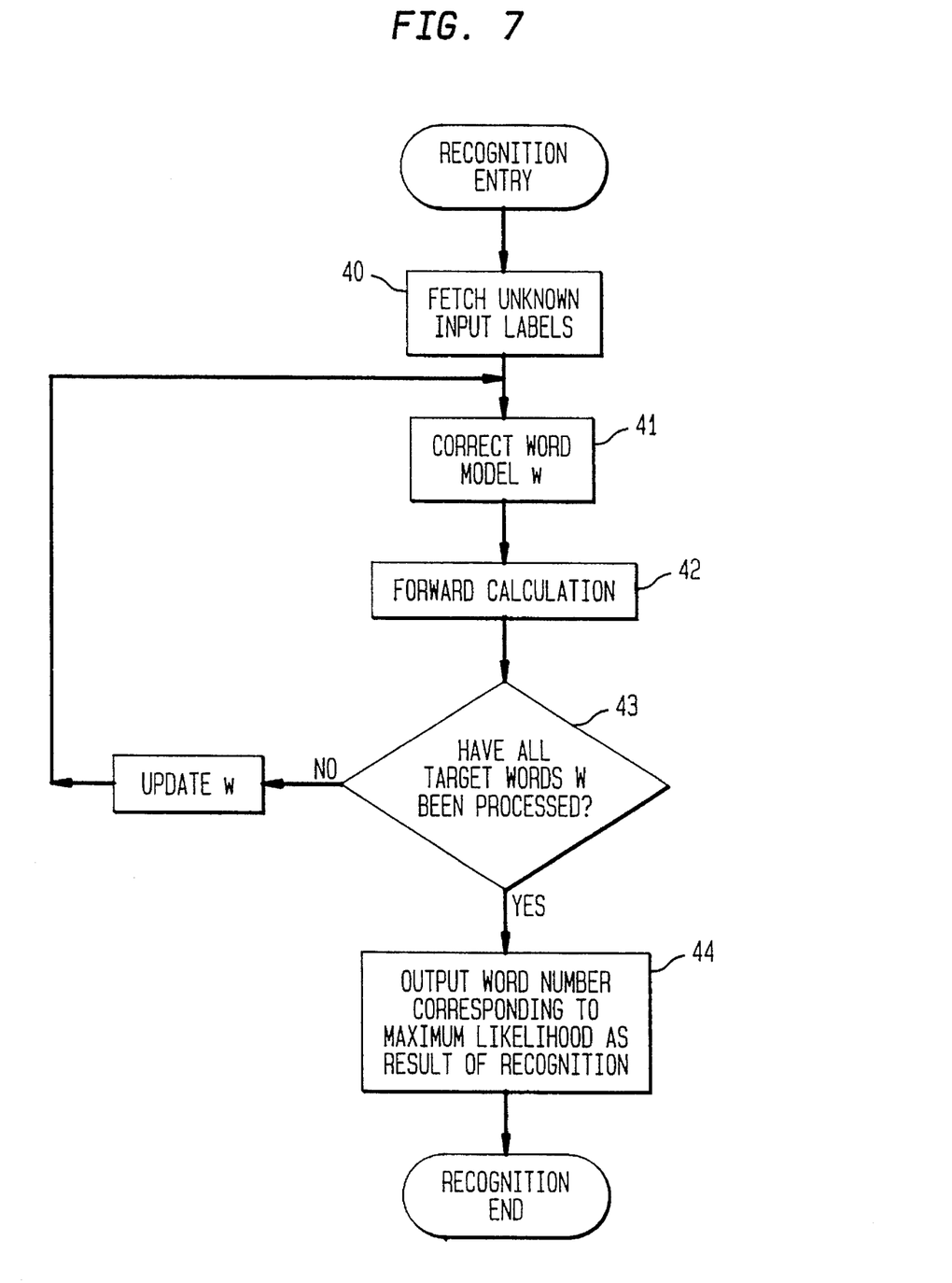
FIG. 7 is a flowchart of speech recognition operations.

Input speech recognition is carried out by the recognizer 16 in the procedure shown in FIG. 7.

First, the input label sequence of word speech to be recognized is read through the switcher 10 (step 40). Next a word speech model as shown in FIG. 8 is composed by reference to the word pronunciation dictionary 13 containing a plurality of candidate words to be recognized, the fenonic allophone baseform table 17, and the parameter table 18 (step 41). The likelihood of the word speech model to output said input label sequence is determined by performing forward calculations (step 42).

Alternatively, the Viterbi algorithm may be used to determine the likelihood that the word speech model would output the observed label sequence.

This processing series is performed on all the candidate words in the word pronunciation dictionary 13 (step 43). A candidate word corresponding to the model providing the greatest likelihood among the word speech models in said process is output as the result of the recognition to the display 19 (step 44) and is displayed on the display screen.

Although in the above described embodiment, an example of a speech model composed of bigrams of fenonic hidden Markov models has been explained with respect to word units as objects of recognition with consideration of allophones of phonemic units, this invention is not limited in scope to this example but can assume various embodiments.

Objects of recognition are not limited to words but may also be phrases or sentences. An object of recognition may be set as a unit of processing at will.

Also, units of speech transformation candidates (allophones) transformed as speech may be syllables and CVC. Other components composing words to be recognized, may be optionally set in accordance with various conditions.

Also, hidden Markov models are not limited to ones of the fenonic type but may also be ones of the phonetic type. Again, hidden Markov models may be joined together with bigram probabilities or various N-gram probabilities (N=an integer greater than or equal to 3).

The invention is an efficient speech recognizer modelling various phonetic transformations (e.g., allophones) caused by pronunciation by combining hidden Markov models with N-gram probabilities.

Also, this invention enables fluctuations in each speaker's pronunciation to be modelled with different allophones, so unlike the method of joining hidden Markov models solely in series, this invention does not need to represent every speaker's pronunciation fluctuations with a single phonetic hidden Markov model.

Moreover, speech models of this invention allow themselves to be retained in component hidden Markov models, and hence these hidden Markov models can also be used for composition of various speech models. Again, speech models of this invention enables a sharp reduction of storage space for models as against modelling speech in word units.

Furthermore, this invention enables the parameters of N-grams to be trained efficiently. When fenonic hidden Markov models are used, those parameters have many opportunities to receive training by various sorts of training speech. Hence, optimum parameters are set even if training is not frequent.

We claim:

1. A speech recognizer comprising:

means for analyzing a word inputted as speech for its features and thus obtaining a label sequence or feature vector sequence corresponding to said word;

means for retaining hidden Markov models respectively for one or more allophones of subwords of each speech transformation candidate;

dictionary means for retaining a plurality of candidate words to be recognized;

means for composing a speech model by concatenating each hidden Markov model for allophones of each speech transformation candidate in parallel among subwords in correspondence to a candidate word;

means for determining a probability of a speech model composed with regard to each candidate word to output the label sequence or feature vector sequence of said word inputted as speech, and outputting the candidate word corresponding to a speech model of a highest probability as a result of recognition.

2. A speech recognizer comprising:

means for analyzing a word inputted as speech for its features and thus obtaining a label sequence or feature vector sequence corresponding to said word;

means for retaining fenonic hidden Markov models;

means for retaining the label sequence for each speech transformation candidate on which subwords of a word are transformed as speech;

dictionary means for retaining a plurality of candidate words to be recognized;

means for applying fenonic hidden Markov models of allophones of subwords of each speech transformation candidate in correspondence to said candidate words and concatenating the models for each speech transformation candidate in parallel among the subwords to compose a speech model;

means for determining a probability of a speech model composed with regard to each candidate word so as to output the label sequence or feature vector sequence of said word inputted as speech, and outputting the candidate word corresponding to the speech model of a highest probability as a result of recognition.

3. A speech recognizer comprising:

means for analyzing a word inputted as speech for its features and thus obtaining a label sequence or feature vector sequence corresponding to said word;

means for retaining hidden Markov models for each speech transformation candidate, the hidden Markov models comprising allophones of one or more subwords of the candidate, by assigning to each allophone an N-gram relation (N=an integer greater than or equal to 2) with the speech transformation candidates of other preceding subwords in the word;

dictionary means for retaining a plurality of candidate words to be recognized;

means for concatenating each hidden Markov model for each speech transformation candidate in parallel among the subwords in correspondence to said candidate words and on the basis of said N-gram relation to compose a speech model;

means for determining the probability of a speech model composed with regard to each candidate word to output the label sequence or feature vector sequence of said word inputted as speech, and outputting a candidate word corresponding to the speech model of the highest probability as a result of recognition.

4. A speech recognizer comprising:

means for analyzing a word inputted as speech for its features and thus obtaining a label sequence or feature vector sequence corresponding to said word;

means for retaining fenonic hidden Markov models for each speech transformation candidate, the hidden Markov models comprising allophones of one or more subwords of the candidate, by assigning to each allophone an N-gram relation (N=an integer greater than or equal to 2) with the speech transformation candidates of other preceding subwords in the word;

dictionary means for retaining a plurality of candidate words to be recognized;

means for applying hidden Markov models to each speech transformation candidate in correspondence to said candidate words and on the basis of said N-gram relation, and concatenating each hidden Markov model for each of these speech transformation candidates in parallel among the subwords to compose a speech model;

means for determining the probability of a speech model composed with regard to each candidate word to output the label sequence or feature vector sequence of said word inputted as speech, and outputting a candidate word corresponding to the speech model of the highest probability as a result of recognition.

5. A method of speech recognition comprising the steps of:

retaining fenonic hidden Markov models for each speech transformation candidate, the hidden Markov models comprising allophones of one or more subwords of the candidate, by assigning to each allophone an N-gram relation (N=an integer greater than or equal to 2) with the speech transformation candidates of other preceding subwords in the word;

retaining label sequences for each speech transformation candidate on which the subwords of a word are transformed as speech;

retaining a plurality of candidate words to be recognized;

analyzing a word inputted as speech for its features and obtaining a label sequence or feature vector sequence corresponding to the word concerned;

applying fenonic hidden Markov models to each speech transformation candidate in correspondence to said candidate words and on the basis of said N-gram relation;

concatenating each fenonic hidden Markov model for each of these speech transformation candidates in parallel among the subwords to compose a speech model;

determining the probability of a speech model composed with regard to each candidate word to output the label sequence or feature vector sequence of said word inputted as speech, and outputting a candidate word corresponding to the speech model of the highest probability as a result of recognition.

6. A method of training a speech model as set forth in claim 5 wherein said hidden Markov model consists of a fenonic hidden Markov model.

\* \* \* \* \*